United States Patent
Schramm et al.

(10) Patent No.: US 10,022,779 B2
(45) Date of Patent: Jul. 17, 2018

(54) MECHANICALLY TUNED RAPID DISCHARGE FORMING OF METALLIC GLASSES

(71) Applicant: Glassimetal Technology, Inc., Pasadena, CA (US)

(72) Inventors: Joseph P. Schramm, Sierra Madre, CA (US); William L. Johnson, San Marino, CA (US); Marios D. Demetriou, West Hollywood, CA (US)

(73) Assignees: Glassimetal Technology, Inc., Pasadena, CA (US); Apple Inc., Cupertino, CA (US)

( * ) Notice: Subject to any disclaimer, the term of this patent is extended or adjusted under 35 U.S.C. 154(b) by 112 days.

(21) Appl. No.: 14/794,163

(22) Filed: Jul. 8, 2015

(65) Prior Publication Data
US 2016/0008870 A1    Jan. 14, 2016

Related U.S. Application Data

(60) Provisional application No. 62/021,801, filed on Jul. 8, 2014.

(51) Int. Cl.
| | |
|---|---|
| B21J 1/00 | (2006.01) |
| B21J 1/02 | (2006.01) |
| B23K 11/26 | (2006.01) |

(52) U.S. Cl.
CPC ................ B21J 1/006 (2013.01); B21J 1/02 (2013.01); *B23K 11/26* (2013.01)

(58) Field of Classification Search
CPC ...... B23K 11/26; B23K 2203/42; C21D 7/00; C21D 7/13; C21D 8/00; C21D 1/09; C21D 1/54; B21J 1/006; B21J 1/02
See application file for complete search history.

(56) References Cited

U.S. PATENT DOCUMENTS

| | | | |
|---|---|---|---|
| 2,467,782 | A | 12/1947 | Schuman |
| 2,816,034 | A | 12/1957 | Mittelmann |
| 3,332,747 | A | 7/1967 | Bundy |
| 3,537,045 | A | 10/1970 | Ichiro |
| 3,863,700 | A | 2/1975 | Bedell et al. |
| 4,115,682 | A | 9/1978 | Kavesh et al. |

(Continued)

FOREIGN PATENT DOCUMENTS

| | | |
|---|---|---|
| CN | 1552940 | 12/2004 |
| CN | 1689733 | 11/2005 |

(Continued)

OTHER PUBLICATIONS

Kulik et al., "Effect of flash- and furnace annealing on the magnetic and mechanical properties of metallic glasses," *Materials Science and Engineering*, A133 (1991), pp. 232-235.

(Continued)

*Primary Examiner* — Pradeep C Battula
(74) *Attorney, Agent, or Firm* — Polsinelli PC

(57) ABSTRACT

A mechanically tuned rapid capacitive discharge forming apparatus and methods that utilize compliant and shock absorbing components in electrode assemblies in order to accommodate the stresses and strains of the thermally-expanding feedstock and maintain continuous electrical contact between the electrodes and the feedstock throughout the duration of the electrical discharge.

21 Claims, 5 Drawing Sheets

(56) References Cited

U.S. PATENT DOCUMENTS

| | | |
|---|---|---|
| 4,355,221 A | 10/1982 | Lin |
| 4,462,092 A * | 7/1984 | Kawabuchi .......... B06B 1/0622 73/626 |
| 4,523,748 A | 6/1985 | Latter |
| 4,715,906 A | 12/1987 | Taub et al. |
| 4,809,411 A | 3/1989 | Lin et al. |
| 4,950,337 A | 8/1990 | Li et al. |
| 5,005,456 A | 4/1991 | Ballard et al. |
| 5,069,428 A | 12/1991 | Li et al. |
| 5,075,051 A | 12/1991 | Ito et al. |
| 5,278,377 A | 1/1994 | Tsai |
| 5,288,344 A | 2/1994 | Peker et al. |
| 5,324,368 A | 6/1994 | Masumoto et al. |
| 5,368,659 A | 11/1994 | Peker et al. |
| 5,550,857 A | 8/1996 | Richards |
| 5,554,838 A | 9/1996 | Berdich |
| 5,618,359 A | 4/1997 | Lin et al. |
| 5,735,975 A | 4/1998 | Lin et al. |
| 5,896,642 A | 4/1999 | Peker et al. |
| 6,027,586 A | 2/2000 | Masumoto et al. |
| 6,235,381 B1 | 5/2001 | Sanders et al. |
| 6,258,183 B1 | 7/2001 | Onuki et al. |
| 6,279,346 B1 | 8/2001 | Ribes et al. |
| 6,293,155 B1 | 9/2001 | Babiel |
| 6,355,361 B1 | 3/2002 | Ueno et al. |
| 6,432,350 B1 | 9/2002 | Seres et al. |
| 6,771,490 B2 | 8/2004 | Peker et al. |
| 6,875,293 B2 | 4/2005 | Peker |
| 7,120,185 B1 | 10/2006 | Richards |
| 7,506,566 B2 | 3/2009 | Decristofaro et al. |
| 7,883,592 B2 | 2/2011 | Hofmann et al. |
| 8,099,982 B2 | 1/2012 | Takagi et al. |
| 8,276,426 B2 | 10/2012 | Musat et al. |
| 8,499,598 B2 | 8/2013 | Johnson et al. |
| 8,613,813 B2 | 12/2013 | Johnson et al. |
| 8,613,814 B2 | 12/2013 | Kaltenboeck et al. |
| 8,613,815 B2 * | 12/2013 | Johnson .................. C21D 7/13 148/561 |
| 8,613,816 B2 * | 12/2013 | Kaltenboeck .......... C22C 1/002 148/561 |
| 8,776,566 B2 | 7/2014 | Johnson et al. |
| 9,044,800 B2 | 6/2015 | Johnson et al. |
| 9,297,058 B2 * | 3/2016 | Demetriou .............. C22C 1/002 |
| 9,393,612 B2 * | 7/2016 | Lee .......................... B21J 1/006 |
| 2001/0033304 A1 | 10/2001 | Ishinaga et al. |
| 2003/0056562 A1 | 3/2003 | Kamano |
| 2003/0183310 A1 | 10/2003 | McRae |
| 2003/0222122 A1 | 12/2003 | Johnson et al. |
| 2004/0035502 A1 | 2/2004 | Kang et al. |
| 2004/0067369 A1 | 4/2004 | Ott et al. |
| 2005/0034787 A1 | 2/2005 | Song et al. |
| 2005/0103271 A1 | 5/2005 | Watanabe et al. |
| 2005/0202656 A1 | 9/2005 | Ito et al. |
| 2005/0217333 A1 | 10/2005 | Daehn |
| 2005/0236071 A1 | 10/2005 | Koshiba et al. |
| 2006/0102315 A1 | 5/2006 | Lee et al. |
| 2006/0293162 A1 | 12/2006 | Ellison |
| 2007/0003782 A1 | 1/2007 | Collier |
| 2007/0034304 A1 | 2/2007 | Inoue et al. |
| 2008/0081213 A1 | 4/2008 | Ito et al. |
| 2008/0135138 A1 | 6/2008 | Duan et al. |
| 2008/0302775 A1 | 12/2008 | Machrowicz |
| 2009/0236017 A1 | 9/2009 | Johnson et al. |
| 2009/0246070 A1 | 10/2009 | Tokuda et al. |
| 2010/0009212 A1 | 1/2010 | Utsunomiya et al. |
| 2010/0047376 A1 | 2/2010 | Imbeau et al. |
| 2010/0121471 A1 | 5/2010 | Higo et al. |
| 2010/0320195 A1 | 12/2010 | Fujita et al. |
| 2011/0048587 A1 | 3/2011 | Vecchio et al. |
| 2012/0103478 A1 | 5/2012 | Johnson et al. |
| 2012/0255338 A1 * | 10/2012 | Johnson .................. C21D 7/13 72/342.1 |
| 2013/0025814 A1 | 1/2013 | Demetriou et al. |
| 2013/0048152 A1 | 2/2013 | Na et al. |
| 2013/0319062 A1 | 12/2013 | Johnson et al. |
| 2014/0033787 A1 | 2/2014 | Johnson et al. |
| 2014/0047888 A1 | 2/2014 | Johnson et al. |
| 2014/0083150 A1 | 3/2014 | Kaltenboeck et al. |
| 2014/0102163 A1 | 4/2014 | Kaltenboeck et al. |
| 2014/0130563 A1 | 5/2014 | Lee et al. |
| 2014/0283956 A1 | 9/2014 | Schramm et al. |
| 2015/0090375 A1 | 4/2015 | Lee et al. |
| 2015/0096967 A1 | 4/2015 | Lee et al. |
| 2015/0299825 A1 | 10/2015 | Prest et al. |
| 2015/0367410 A1 | 12/2015 | Schramm et al. |
| 2016/0298205 A1 | 10/2016 | Johnson et al. |

FOREIGN PATENT DOCUMENTS

| | | |
|---|---|---|
| CN | 201838352 | 5/2011 |
| CN | 103320783 | 9/2013 |
| FR | 2806019 | 9/2001 |
| GB | 215522 | 5/1924 |
| GB | 2148751 | 6/1985 |
| JP | 48-008694 | 3/1973 |
| JP | 63-220950 | 9/1988 |
| JP | H06-57309 | 3/1994 |
| JP | H06-277820 | 10/1994 |
| JP | H 08-024969 | 1/1996 |
| JP | 08-300126 | 11/1996 |
| JP | 10-263739 | 10/1998 |
| JP | 10-296424 | 11/1998 |
| JP | 11-001729 | 1/1999 |
| JP | 11-104810 | 4/1999 |
| JP | 11-123520 | 11/1999 |
| JP | 11-354319 | 12/1999 |
| JP | 2000-119826 | 4/2000 |
| JP | 2000-169947 | 6/2000 |
| JP | 2001-321847 | 11/2001 |
| JP | 2001-347355 | 12/2001 |
| JP | 2003-509221 | 3/2003 |
| JP | 2005-209592 | 8/2005 |
| JP | 2008-000783 | 1/2008 |
| JP | 2011-517623 | 6/2011 |
| JP | 2013-530045 | 7/2013 |
| KR | 10-0271356 | 11/2000 |
| WO | WO 01/21343 | 3/2001 |
| WO | WO 2009/048865 | 4/2009 |
| WO | WO 09/117735 | 9/2009 |
| WO | WO 11/127414 | 10/2011 |
| WO | WO 12/051443 | 4/2012 |
| WO | WO 12/092208 | 7/2012 |
| WO | WO 12/103552 | 8/2012 |
| WO | WO 12/112656 | 8/2012 |
| WO | WO 2014/078697 | 5/2014 |

OTHER PUBLICATIONS

De Oliveira et al., "Electromechanical engraving and writing on bulk metallic glasses", Applied Physics Letters, Aug. 26, 2002, vol. 81, No. 9, pp. 1606-1608.

Duan et al., "Bulk Metallic Glass with Benchmark Thermoplastic Processability", Adv. Mater., 2007, vol. 19, pp. 4272-4275.

Ehrt et al., "Electrical conductivity and viscosity of borosilicate glasses and melts," Phys. Chem. Glasses: Eur. J. Glass Sci. Technol. B, Jun. 2009, 50(3), pp. 165-171.

Love, "Temperature dependence of electrical conductivity and the probability density function," J. Phys. C: Solid State Phys., 16, 1983, pp. 5985-5993.

Mattern et al., "Structural behavior and glass transition of bulk metallic glasses, "Journal of Non-Crystalline Solids, 345&346, 2004, pp. 758-761.

Wiest et al., "Zi-Ti-based Be-bearing glasses optimized for high thermal stability and thermoplastic formability", Acta Materialia, 2008, vol. 56, pp. 2625-2630.

Yavari et al., "Electromechanical shaping, assembly and engraving of bulk metallic glasses", Materials Science and Engineering A, 2004, vol. 375-377, pp. 227-234.

Yavari et al., "Shaping of Bulk Metallic Glasses by Simultaneous Application of Electrical Current and Low Stress", Mat. Res. Soc. Symp. Proc., 2001, vol. 644, pp. L12.20.1-L12.20.6.

(56) References Cited

OTHER PUBLICATIONS

Demetriou, Document cited and published during Applicant Interview Summary conducted on Jan. 29, 2013, entitled, "Rapid Discharge Heating & Forming of Metallic Glasses: Concepts, Principles, and Capabilities," Marios Demetriou, 20 pages.

Saotome et al., "Characteristic behavior of Pt-based metallic glass under rapid heating and it application to microforming," *Materials Science and Engineering A*, 2004, vol. 375-377, pp. 389-393.

Masuhr et al., Time Scales for Viscous Flow, Atomic Transport, and Crystallization in the Liquid and Supercooled Liquid States of Zr41.2Ti13.8Cu12.5Ni10.0Be22.5,: *Phys. Rev. Lett.*, vol. 82, (1999), pp. 2290-2293.

Schroers et al., "Pronounced asymmetry in the crystallization behavior during constant heating and cooling of a bulk metallic glass-forming liquid," *Phys. Rev. B*, vol. 60, No. 17 (1999), pp. 11855-11858.

Johnson et al., "A Universal Criterion for Plastic Yielding of Metallic Glasses with a $(T/T_g)2/3$ Temperature Dependence," *Physical Review Letter*, (2005), PRL 95, pp. 195501-195501-4.

\* cited by examiner

US 10,022,779 B2

MECHANICALLY TUNED RAPID DISCHARGE FORMING OF METALLIC GLASSES

PRIORITY

The application claims the benefit under 35 U.S.C. § 119(e) of U.S. Provisional Patent Application No. 62/021,801, entitled "Mechanically Tuned Rapid Discharge Forming of Metallic Glasses," filed on Jul. 8, 2014, which is incorporated herein by reference in its entirety.

BACKGROUND

The rapid capacitive discharge forming (RCDF) method, as described in U.S. Pat. No. 8,613,813, uses dissipation of electrical current to heat metallic glass feedstock substantially uniformly at time scales far shorter than typical times associated with crystallization. By application of force, the metallic glass is shaped into an object, and subsequently cooled to revitrify. One exemplary embodiment of the RCDF process is injection molding, described in U.S. Patent Application No. 2013/0025814 (filed Jan. 31, 2013). In some injection molding approaches, the electrodes can act as plungers and thus apply both electrical energy to heat and soften the metallic glass feedstock and force to shape the metallic glass feedstock. In such systems, following the application of electrical energy and force by the electrodes/plungers, the heated and softened metallic glass feedstock can be urged into a mold cavity where it can be shaped and cooled to revitrify.

SUMMARY

In some embodiments, the disclosure is directed to an RCDF method performed by including at least one component in each electrode assembly having at least one property selected from an elastic modulus E of up to 10 GPa, and a loss tangent tan δ of at least 0.001 at frequencies ranging from 10 Hz to 10 kHz.

In another embodiment, the at least one component has at least one property selected from an E of up to 5 GPa and a tan δ of at least 0.005 at frequencies ranging from 20 Hz to 5 kHz.

In another embodiment, the at least one component has at least one property selected from an E of up to 1 GPa and a tan δ of at least 0.01 at frequencies ranging from 50 Hz to 20 kHz.

In yet another embodiment, the at least one component has at least one property selected from an E of up to 0.5 GPa and a tan δ of at least 0.05 at frequencies ranging from 100 Hz to 1 kHz.

In yet another embodiment, the at least one component is a polymer.

In yet another embodiment, the at least one component is a rubber.

In yet another embodiment, the at least one component is a pneumatic cylinder.

In yet another embodiment, a finite compressive force is continuously applied on the metallic glass feedstock by the electrodes during electrical discharge.

In yet another embodiment, a finite electrical current is continuously passes across the metallic glass feedstock through the electrodes during electrical discharge.

In other embodiments, the disclosure is directed to an RCDF apparatus that includes at least one component in each electrode assembly having at least one property selected from an E of up to 10 GPa and a tan δ of at least 0.001 at frequencies ranging from 10 Hz to 10 kHz.

In another embodiment, the at least one component has at least one property selected from an E of up to 5 GPa and a tan δ of at least 0.005 at frequencies ranging from 20 Hz to 5 kHz.

In another embodiment, the at least one component has at least one property selected from an E of up to 1 GPa and a tan δ of at least 0.01 at frequencies ranging from 50 Hz to 20 kHz.

In yet another embodiment, the at least one component has at least one property selected from an E of up to 0.5 GPa and a tan δ of at least 0.05 at frequencies ranging from 100 Hz to 1 kHz.

In yet another embodiment, the at least one component is a polymer.

In yet another embodiment, the at least one component is a rubber.

In yet another embodiment, the at least one component is a pneumatic piston.

Additional embodiments and features are set forth in part in the description that follows, and in part will become apparent to those skilled in the art upon examination of the specification or may be learned by the practice of the disclosure. A further understanding of the nature and advantages of the disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
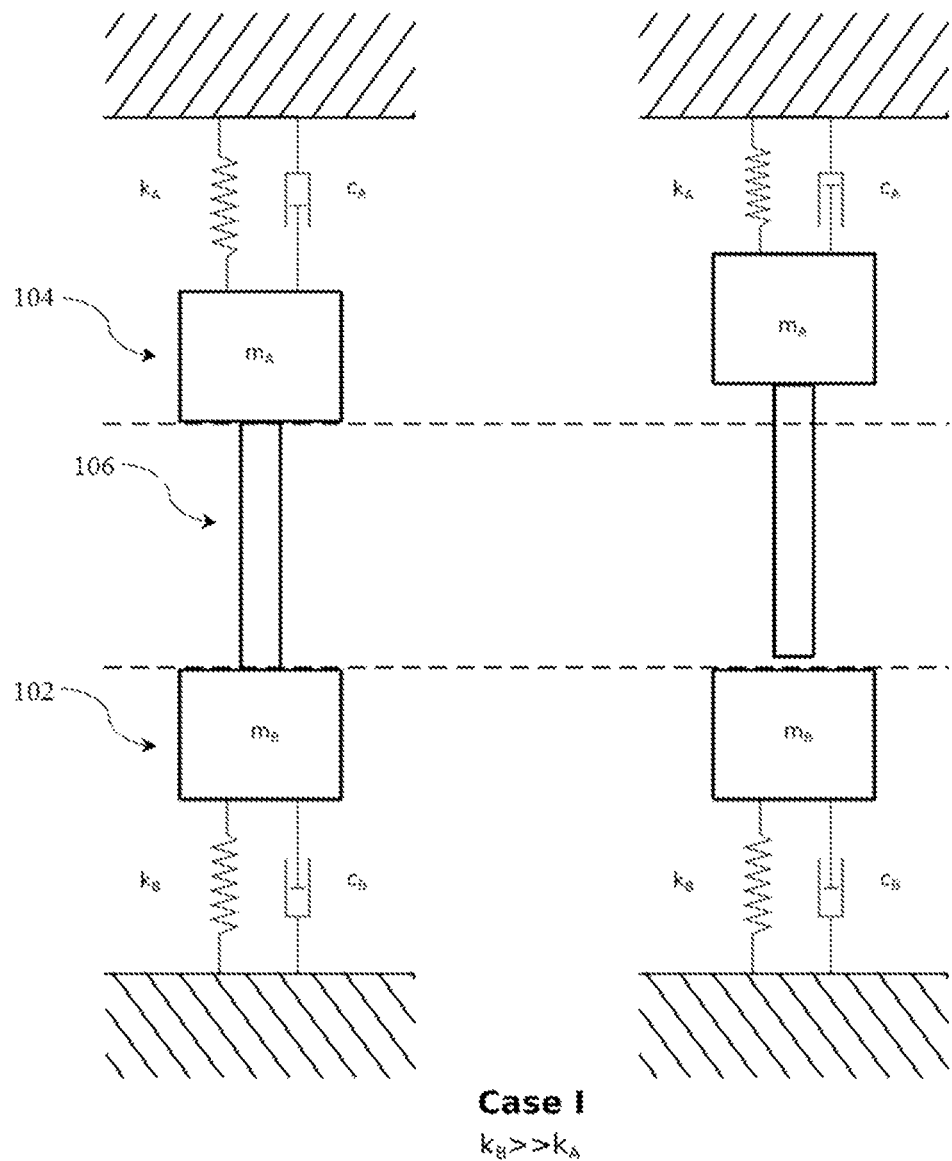
FIG. 1 provides a schematic illustrating the failure case where a heated feedstock thermally expands against electrode assemblies having very different stiffness values k.

The disclosure may be understood by reference to the following detailed description, taken in conjunction with the drawings as described below. It is noted that, for purposes of illustrative clarity, certain elements in various drawings may not be drawn to scale.

In accordance with the provided disclosure and drawings, apparatus, systems and methods for mechanically tuning the RCDF process are provided. In many embodiments, methods and apparatus are provided to mechanically tune the RCDF process such that substantially continuous contact is maintained between the electrode and the metallic glass feedstock throughout the duration of the electrical discharge. In some embodiments an undesirable break in electrical contact is prevented by tuning the dynamic mechanical response properties of one or more components of the electrode assemblies of the RCDF system. In some other embodiments, apparatus and methods are provided capable of maintaining mechanical and electrical contact between the electrodes and the metallic glass feedstock throughout the delivery of the current pulse and during the thermal expansion of the metallic glass feedstock in the RCDF injection molding process to improve the repeatability and reliability of these RCDF systems such as to increase the efficiency and yield of the overall RCDF process.

Although systems and methods for performing rapid current discharge forming (RCDF) have been previously described, there has been little development on systems and methods for ensuring a substantially uniform discharge process during processing of a feedstock. In the RCDF method, a metallic glass feedstock is heated substantially uniformly by the dissipation of electrical energy as a pulse of current is passed through the feedstock. If the contact between the feedstock and an electrode is broken at any time during the transport of the current pulse, an electrical arc will form, dissipating energy locally at the feedstock-electrode interface and compromising the uniformity of the heating process. Such a discontinuous discharge process may impair the RCDF method, as the requirement for substantially uniform feedstock heating may be compromised. Accordingly, in many embodiments, methods and systems that improve the continuity of the current discharge in an RCDF cycle are provided.

In some embodiments the mechanically tuned RCDF systems and methods are provided for an injection molding process. In embodiments of an injection molding apparatus, at least one electrode also acts as a plunger, as shown schematically in FIGS. 1 and 2. In some embodiments of an injection molding apparatus, the contact between an electrode and the feedstock is ensured by applying a finite axial compressive force against the feedstock via the electrodes.

To explain how the thermally expanding feedstock may lose contact with the electrodes, it is useful to understand how the metallic glass feedstock mechanically interacts with the electrodes during heating. It is also useful to recognize that in RCDF injection molding each of the electrodes/plungers acts as an "assembly" that may effectively behave as an oscillator. First, with respect to the behavior of the feedstock during heating, when a metallic glass feedstock of initial length $L_i$ is heated by a current pulse that generates a heating rate $\dot{T}$, it undergoes thermal expansion at a rate proportional to the rate of heating. Specifically, the theoretical rate of elongation of the feedstock $\dot{L}$ can be approximated by:

$$\dot{L} \sim \alpha L_i \dot{T} \qquad \text{Eq. 1}$$

where $\alpha$ is the metallic glass thermal expansion coefficient. Taking $\alpha \sim 2 \times 10^{-5}$ K$^{-1}$ (typical for metallic glass), $\dot{T} \sim 1 \times 10^5$ K/s (typical RCDF heating rate), and $L_i \sim 0.05$ m (typical of RCDF feedstock), one can estimate $\dot{L} \sim 0.1$ m/s. Typically, the rate of feedstock elongation can range from 0.01 to 10 m/s. Now turning to the "electrode assembly", which is defined here to include the electrode/plunger, any actuator (e.g. a pneumatic, hydraulic, magnetic drive, etc.) delivering force on the electrode/plunger, and any object that may be used at the interface to connect the two. Treating the electrode assembly, as a unified mass connected to a spring-damper system (as shown schematically in FIGS. 1 and 2), each electrode assembly would be associated with an overall mass m, stiffness k, and damping coefficient c, and would respond to the feedstock expansion by complying and/or damping the motion.

There are at least two cases in which the thermally expanding feedstock may give rise to electrical contact breakdown with the electrode and potentially compromise the uniformity of heating. In a first exemplary case (illustrated schematically in FIG. 1), if one of the electrode assemblies 102 has a very high stiffness k, i.e. is effectively uncompliant, while the other electrode assembly 104 is much more compliant having substantially lower stiffness, the feedstock expansion will extend predominantly towards the low-stiffness assembly (in the schematic system shown in FIG. 1 toward electrode assembly 104). As the feedstock expansion occurs predominantly in one direction, the feedstock center of gravity would translate in the direction of expansion thereby generating an impulse to the feedstock. Due to this impulse, the feedstock 106 may vault and separate from the electrode of the stiff assembly (the assembly with high stiffness k) causing a break in electrical contact and generating an arc across the feedstock-electrode gap.

In a second exemplary case (illustrated schematically in FIG. 2), if either of the electrode assemblies 102 and 104 has a very low damping coefficient c (in this example electrode assembly 104), the thermally expanding feedstock imparting a velocity on such assembly may promote an underdamped motion of the assembly and create an impulse on the assembly. Due to this impulse, the electrode of such assembly (i.e., electrode assembly 104) may vault and separate from the feedstock 106 causing a break in electrical contact and generating an arc across the feedstock-electrode gap.

Embodiments are provided for apparatus and methods adapted to maintain mechanical and electrical contact between the electrodes and the metallic glass feedstock throughout the delivery of the current pulse and during the thermal expansion of the metallic glass feedstock in the RCDF injection molding process by tuning the dynamic mechanical response properties of one or more components of the electrode assemblies of an RCDF system.

In many embodiments, to avoid any break in mechanical and electrical contact between the feedstock and an electrode that might give rise to a discontinuity in current flow, impulses imparted on either the feedstock or an electrode due to the thermal expansion of the feedstock are adapted to be as small as possible and/or quickly damped. In some embodiments, this is ensured by providing a finite, mechanically tuned, compressive force that is maintained on the feedstock by the electrodes throughout the duration of the discharge.

In other embodiments, processes for determining an appropriate mechanical tuning for an RCDF system are also provided. For example, assuming that the electrode assembly is a simple harmonic oscillator (as described above), the time dependent force applied by an electrode on the feedstock $F_a(t)$ may be given by:

$$F_a(t) \sim F_o + kx + c \, dx/dt \qquad \text{Eq. 2}$$

where $F_o$ is the force delivered by the actuator (e.g. the pneumatic, hydraulic, or magnetic drive), k is the spring constant, and c is the damping coefficient of the electrode assembly, while x is the axial dimensional coordinate originating at the electrode-feedstock interface.

The time dependent force applied by the feedstock on the electrode assembly due to its thermal expansion $F_e(t)$ is given by:

$$F_e(t) \sim \alpha_f E_f A_f (T(t) - T_i) \qquad \text{Eq. 3}$$

where $\alpha_f$ is the linear thermal expansion coefficient of the metallic glass feedstock, $E_f$ is the metallic glass Young's modulus, $A_f$ is the cross sectional area of the metallic glass feedstock (perpendicular to the direction of the current flow), $T(t)$ is the time dependent feedstock temperature, and $T_i$ is the initial feedstock temperature. The maximum force will be attained when the current pulse substantially terminates and the feedstock temperature roughly reaches a plateau. For a typical RCDF cycle, the feedstock plateau temperature can be approximated by $(T(t)-T_i)_{max} = \dot{T}\tau$, where $\tau$ is the rise time of the current pulse in a typical RCDF circuit, and typically takes values of about $\tau \sim 0.005$ s. Taking $\alpha_f \sim 2 \times 10^{-5}$ K$^{-1}$ and $E_f \sim 100 \times 10^9$ Pa (typical for metallic glass), $\dot{T} \sim 1 \times 10^5$ K/s (typical RCDF heating rate), and $A_f \sim 2 \times 10^{-5}$ m$^2$ (typical cross sectional area for RCDF feedstock), one can calculate $(T(t)-T_i)_{max} \sim 500°$ C. and $(F_e(t))_{max} \sim 20$ kN. Typically, the force due to feedstock thermal expansion for metallic glasses can range from 1 to 500 kN.

Using these values and calculations it is possible to determine the mechanical tuning criterion for ensuring continuous electrical and mechanical contact in accordance with embodiments of the systems and methods set forth in this application. In many embodiments, the following condition is met throughout the entire duration of the current pulse:

$$F_a(t) > F_e(t) \qquad \text{Eq. 4}$$

Figure 2:
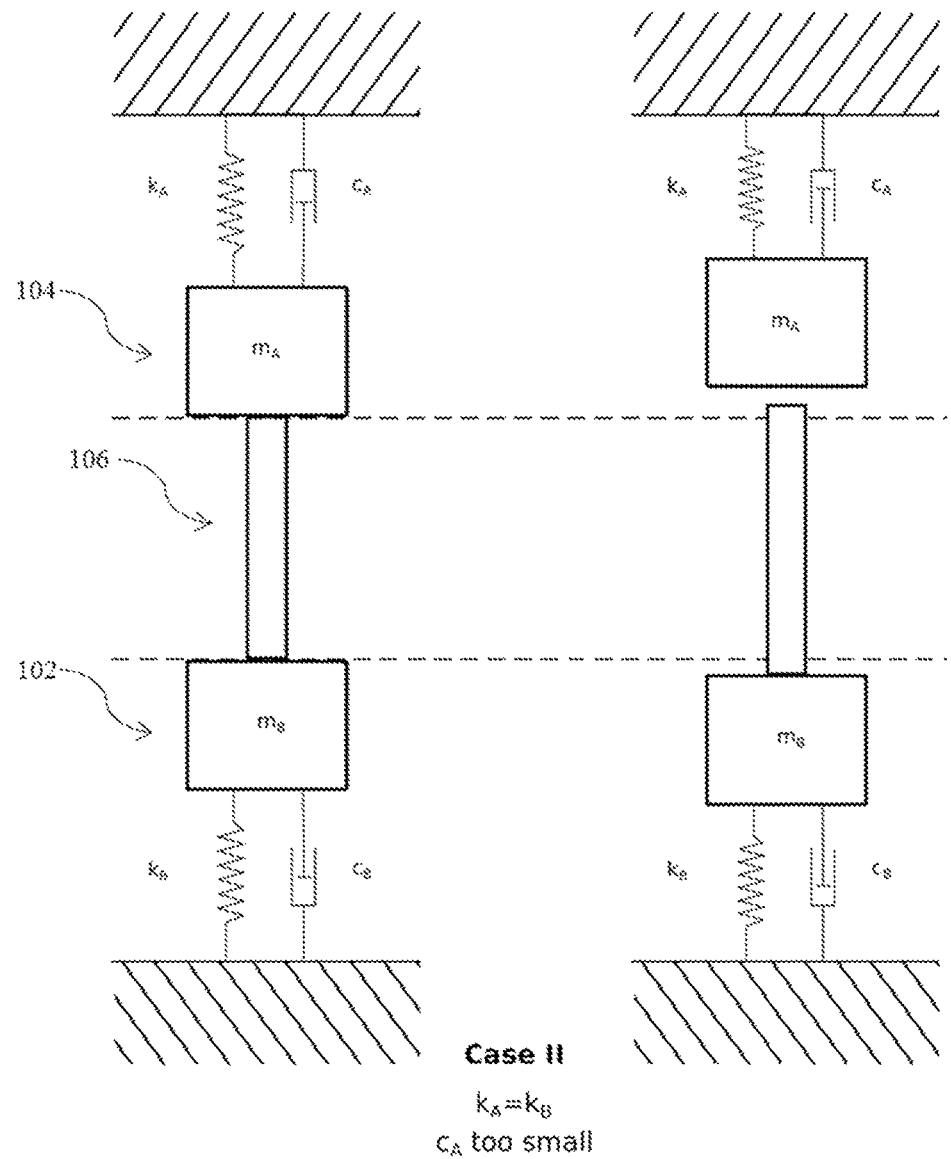
FIG. 2 provides a schematic illustrating the failure case where a heated feedstock thermally expands against electrode assemblies having equal stiffness values k, but with one of the assemblies having a very small damping factor c.

In order to satisfy this criterion for a two-electrode RCDF injection molding system (such as those shown schematically in FIGS. 1 and 2), in some embodiments the dynamic mechanical response of the electrode assemblies 102 and 104 are tuned so that the spring stiffness of the two assemblies are substantially similar such that the thermal expansion of the feedstock 106 may not impart a net impulse to the feedstock that would cause separation from the stiffer electrode assembly, as illustrated in FIG. 1.

In other embodiments, the electrode assemblies are adapted to have a high damping ratio, where the damping ratio is defined as:

$$\zeta = c/c_{cr} \qquad \text{Eq. 5}$$

and where c is the damping coefficient introduced above and $c_{cr}$ is the critical damping coefficient defined as:

$$c_{cr} = 2\sqrt{km} \qquad \text{Eq. 6}$$

where k is the spring constant and m is the mass of the electrode assembly. When $\zeta < 1$, the system is underdamped and may oscillate. When $\zeta \geq 1$, the system is critically damped or overdamped and the impulse imparted to the electrodes by the expansion of the feedstock may be absorbed entirely without oscillation in at most one cycle at the natural frequency of the mass-spring-damper system. Accordingly, in many embodiments the one or more components of the electrode assemblies of the RCDF system are adapted to be critically damped or overdamped.

In many embodiments, the electrode assembly is not a unified mass attached to a spring and damper, but a collection of components that can include, but are not limited to, an electrode, an actuator, an effectively rigid base, and any other component that is placed at the interface between any two of the aforementioned components. Each component may have a mass and a dynamic response to the forces applied by the rapidly thermally expanding feedstock rod during RCDF heating. As these components can be arranged in series, the force applied to the feedstock rod may be transmitted completely through each component. As such, the dynamic mechanical properties of an electrode assembly may be dominated by the properties of just one of the components, i.e. of the component having the lowest stiffness or the highest damping, which will effectively cause it to act as a "shock absorber". In other embodiments, more than one component can act as a "shock absorber".

Accordingly, in still other embodiments one or more components of each of the electrode assemblies of an RCDF system are adapted such that the components of the electrode assemblies render the stiffness of the at least two electrode assemblies to be substantially similar such that the electrode assemblies have a high damping ratio.

The dynamic response of a material is frequently examined by applying a sinusoidal strain, $\epsilon$, and measuring the corresponding stress response, $\sigma$. When a purely elastic element is subjected to this type of test, the stress response is proportional to the applied strain, $\sigma = E\epsilon$, with elastic modulus, E, and the stress response is in phase with the applied strain. When a purely viscous element is subjected to this type of test, the stress response is proportional to applied strain rate $\sigma = \eta \dot{\epsilon}$, with viscosity, $\eta$, and the stress response is 90° out of phase with the applied strain. When a viscoelastic material is subjected to this type of testing the material exhibits a complex behavior somewhere between these two extremes. In such cases the stress can be described by a complex number, $\sigma^*$, which can be resolved into the real (in phase) component, $\sigma'$, and the imaginary (out of phase) component, $\sigma''$:

$$\sigma^* = \sigma' + i\sigma'' \qquad \text{Eq. 7}$$

where i is the out of phase unit vector.

The "in phase" or "storage" modulus and "out of phase" or "loss" modulus are defined by Eq. 8 and Eq. 9 respectively.

$$E' = \sigma'/\epsilon' \qquad \text{Eq. 8}$$

$$E'' = \sigma''/\epsilon' \qquad \text{Eq. 9}$$

The loss tangent, tan $\delta$, is a measure of the capacity of a viscoelastic material to damp vibrations. Here $\delta$ is the phase angle between the applied strain and the lagging stress response.

$$\tan \delta = E''/E' \qquad \text{Eq. 10}$$

The loss tangent is also proportional to the dissipation of energy in the material under a sinusoidal applied strain:

$$W_{dis}/W_{st} = 2\pi \tan \delta \qquad \text{Eq. 11}$$

where $W_{dis}$ is the work done in dissipating energy over one cycle and $W_{st}$ is the work done in storing energy over one cycle. So for tan $\delta = 1$, half of the energy imparted to the material is dissipated and half of the energy is stored as elastic energy. In the case of a deformation occurring at a frequency of $\sim 0.2$ kHz ($\tau \sim 0.005$ s), as applied by a thermally expanding feedstock rod in the RCDF process, the material of a component in the electrode assembly having tan $\delta = 1$ at 0.2 kHz would absorb half of the energy of the expanding feedstock rod in the first cycle of oscillation after the impulse.

Accordingly, in some embodiments of the systems and methods, one or more vibration-damping or shock-absorbing components may be provided in the electrode assembly having low E at the frequency of RCDF heating. In one embodiment, such component or components may have E lower than the elastic modulus of the metallic glass feedstock $E_f$ at the frequency of RCDF heating. In such embodiments, the vibration-damping or shock-absorbing component or components would mechanically tune the electrode assembly such that it would be compliant and accommodate any stresses arising from the thermally-expanding heated feedstock. In other embodiments of the disclosure, the vibration-damping or shock-absorbing component or components may also have a high tan δ at the frequency of RCDF heating. In such embodiments, the vibration-damping or shock-absorbing component or components would collectively mechanical tune the electrode assembly to absorb the strain induced by the thermally-expanded heated feedstock. In still other embodiments, vibration-damping or shock-absorbing component or components in the electrode assembly are provided having a low E and a high tan δ at the frequency of RCDF heating such that the collectively combined low E and a high tan δ mechanically tunes the RCDF system to prevent a break in the electrical contact between the feedstock and the electrode.

Figure 3:
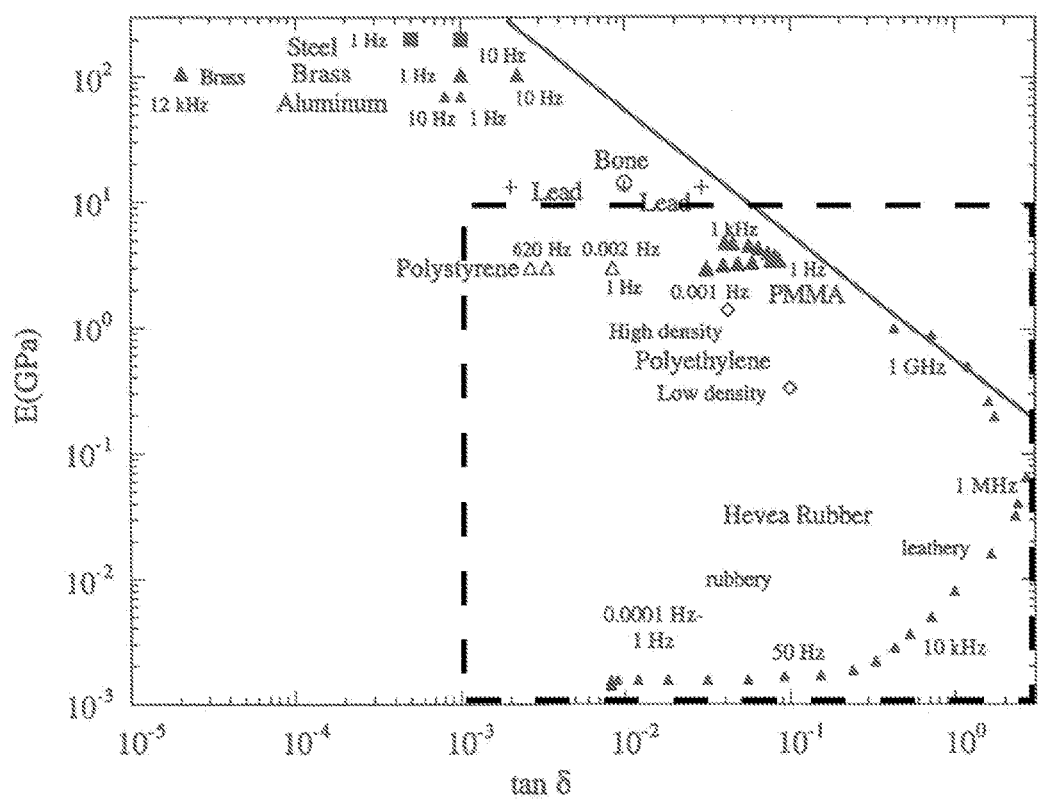
FIG. 3 provides a performance map showing ranges for elastic modulus E and loss tangent tan δ for various materials and a region of the performance map for mechanical tuning materials in accordance with embodiments of the disclosure.

Ranges for E and tan δ for various materials are presented in a performance map in FIG. 3 (map taken from Lakes, Roderic L. Viscoelastic Solids. Boca Raton: CRC Press, 1999, the reference of which is incorporated herein in its entirety). Among the materials plotted in the map, polymers and specifically rubbers appear to have the lowest E and highest tan δ. Therefore, components that may be included in an electrode assembly that may satisfy the compliance and damping criteria set forth in this disclosure may comprise a polymer or a rubber.

Other types of components that may be included in an electrode assembly may satisfy the compliance and damping criteria set forth in this disclosure. One such component is a pneumatic cylinder, which may be part of a pneumatic piston assembly that may apply the force $F_o$ in the RCDF system. Other such components include a hydraulic or magnetic drive that exhibit the compliance and damping criteria set forth in this disclosure.

In certain embodiments of the disclosure, RCDF is performed by including at least one component in each electrode assembly having low E, and/or a high tan δ in the range of oscillation frequencies associated with RCDF heating. In embodiments such frequencies are approximately the inverse of τ, which is the rise time of the current pulse in a typical RCDF circuit. These rise times in accordance with embodiments can range from 0.1 ms to 100 ms. Therefore, in one embodiment, the frequencies associated with RCDF heating range from 10 Hz to 10 kHz. In another embodiment, the frequencies associated with RCDF heating range from 20 Hz to 5 kHz. In another embodiment, the frequencies associated with RCDF heating range from 50 Hz to 2 kHz. In yet another embodiment, the frequencies associated with RCDF heating range from 100 Hz to 1 kHz.

In some embodiments, the frequency associated with RCDF heating is at least 10 Hz. In some embodiments, the frequency associated with RCDF heating is at least 20 Hz. In some embodiments, the frequency associated with RCDF heating is at least 50 Hz. In some embodiments, the frequency associated with RCDF heating is at least 100 Hz. In some embodiments, the frequency associated with RCDF heating is less than or equal to 1 kHz. In some embodiments, the frequency associated with RCDF heating is less than or equal to 2 kHz. In some embodiments, the frequency associated with RCDF heating is less than or equal to 5 kHz. In some embodiments, the frequency associated with RCDF heating is less than or equal to 10 kHz.

In certain embodiments of the disclosure, RCDF is performed by including at least one component in each electrode assembly having one of either an E of up to 10 GPa or a tan δ of at least 0.001. This range is designated by dotted lines in FIG. 3. In one embodiment of the disclosure, RCDF is performed by including at least one component in each electrode assembly having one of either an E of up to 5 GPa or a tan δ of at least 0.005. In another embodiment of the disclosure, RCDF is performed by including at least one component in each electrode assembly having one of either an E of up to 1 GPa or a tan δ of at least 0.01. In yet another embodiment of the disclosure, RCDF is performed by including at least one component in each electrode assembly having one of either an E of up to 0.5 GPa or a tan δ of at least 0.05. In other embodiments the at least one component has both an E or a tan δ within one of the cited ranges above.

Figure 4:
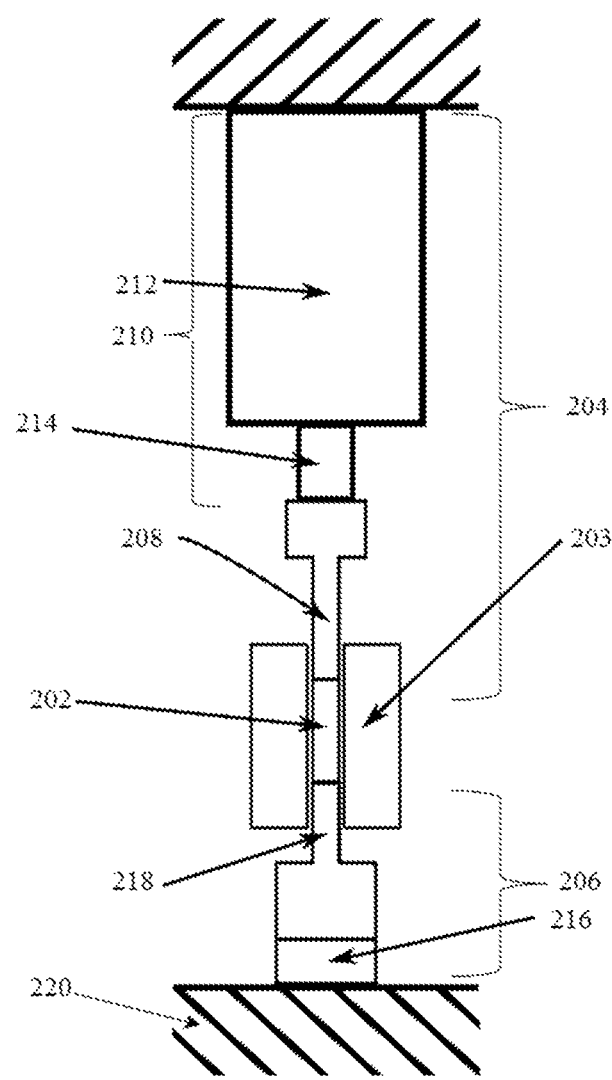
FIG. 4 provides a schematic of an RCDF apparatus with electrode assemblies that incorporate at least one component (pneumatic cylinder on the top assembly and a rubber at the bottom assembly) having an elastic modulus E and loss tangent tan δ within the ranges disclosed herein.

Example 1: Schematic of RCDF Electrode Assemblies Including at Least One Component According to the Current Disclosure FIG. 4 provides a schematic illustrating a metallic glass feedstock sample 202 contained by mold tooling 203 and loaded between two electrode assemblies 204 and 206. In this embodiment, electrode assembly 204 includes an electrode 208 in contact with tuning component 210 that includes a pneumatic cylinder 212, which satisfies the compliance and damping values set forth herein, and a piston ram 214. Meanwhile, electrode assembly 206 includes tuning component 216 comprised of a layer of rubber placed between electrode 218 and machine table 220, which satisfies the compliance and damping criteria set forth herein.

Example 2: RCDF Process Performed with and without at Least One Component in Each Electrode Assembly According to the Current Disclosure Metallic glass rods with a nominal diameter of 5 mm and length ranging from 29.34 mm to 30.69 mm were verified to be amorphous by x-ray diffraction, and were used as feedstock in RCDF injection molding experiments. For each experiment, a feedstock rod was loaded between two electrode assemblies so that it was placed between and axially aligned with two copper electrodes 5-mm in diameter. Two experiments (Case 1 and Case 2) were performed. In Case 1, no component according to the current disclosure was included in one of the electrode assemblies, and in Case 2, at least one such mechanical tuning component was included in each electrode assembly.

In Case 1, one of the electrode assemblies included an electrode in contact with a pneumatic cylinder, while the other electrode assembly included an electrode placed on an effectively rigid machine table. In Case 2, one of the electrode assemblies included an electrode in contact with a pneumatic cylinder, while the other electrode assembly included an electrode placed on a layer of rubber, used as a mechanical damper, placed between the electrode and the machine table.

In both cases, a compressive load $F_o$ of 315 lb was applied axially to the aligned electrodes and feedstock using the pneumatic cylinder. A capacitor bank of 0.792 F was charged to between 115 and 117 V, and discharged through the electrodes and feedstock. The instantaneous current pulse across the feedstock was measured using a Rogowski coil and the current data was collected with an oscilloscope.

Figure 5:
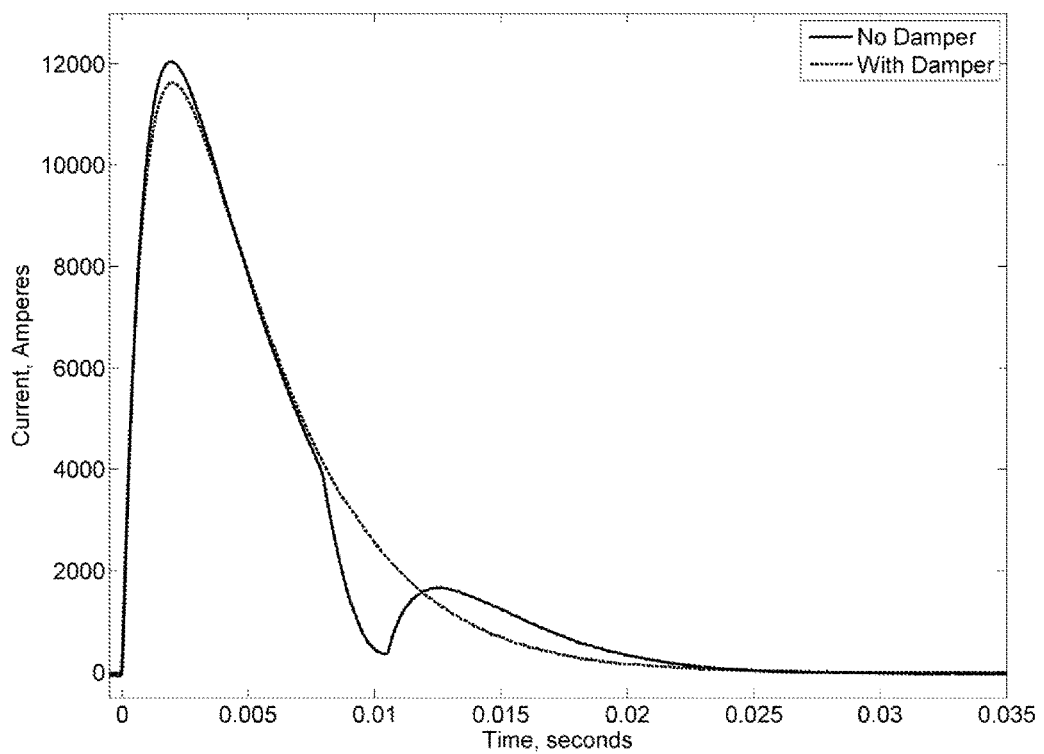
FIG. 5 provides data graphs showing current dissipation curves for non-mechanically tuned and mechanically tuned electrode assemblies in accordance with embodiments of the disclosure.

As seen in FIG. 5, in Case 1 where one electrode assembly included a pneumatic cylinder as a component satisfying the compliance and damping criteria set forth herein but no such component was included in the second assembly, the current shows a discontinuity, indicating that contact between electrode and feedstock was not continuous throughout the electrical discharge process. In Case 2 on the other hand, where one electrode assembly included a pneumatic cylinder as a component satisfying the compliance and damping criteria set forth herein, and the other assembly included a layer of rubber as a component satisfying the compliance and damping criteria set forth herein, the current is shown to be continuous thereby indicating that contact between electrode and feedstock was continuous throughout the electrical discharge process.

The methods and apparatuses herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone®, and an electronic email sending/receiving device. It can be a part of a display, such as a digital display, a TV monitor, an electronic-book reader, a portable web-browser (e.g., iPad®), watch and a computer monitor. It can also be an entertainment device, including a portable DVD player, conventional DVD player, Blue-Ray disk player, video game console, music player, such as a portable music player (e.g., iPod®), etc. It can also be a part of a device that provides control, such as controlling the streaming of images, videos, sounds (e.g., Apple TV®), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An RCDF method comprising:
   applying a force to a metallic glass feedstock disposed between a first electrode assembly comprising a first electrode and a first tuning component and a second electrode assembly comprising a second electrode and a second tuning component; and
   passing an electrical current across the metallic glass feedstock through the electrodes of the two electrode assemblies to heat the metallic glass to a shaping temperature;
   wherein the first tuning component is selected from a group consisting of a pneumatic cylinder, a hydraulic drive, and a magnetic drive,
   wherein the second tuning component is selected from a group consisting of a polymer block, a rubber block, a pneumatic cylinder, a hydraulic drive, and a magnetic drive, and
   wherein at least one of the first or second tuning component has an elastic modulus (E) of up to 10 GPa at frequencies ranging from 10 Hz to 10 kHz and a component of each of the at least two electrode assemblies has a loss tangent (tan $\delta$) of at least 0.001 at frequencies ranging from 10 Hz to 10 kHz.

2. The RCDF method of claim 1, wherein at least one of the first or second tuning component has at least one property selected from an elastic modulus (E) of up to 5 GPa and a loss tangent (tan $\delta$) of at least 0.005 at frequencies ranging from 20 Hz to 5 kHz.

3. The RCDF method of claim 1, wherein at least one of the first or second tuning component has at least one property selected from an elastic modulus (E) of up to 1 GPa and a loss tangent (tan $\delta$) of at least 0.01 at frequencies ranging from 50 Hz to 20 kHz.

4. The RCDF method of claim 1, wherein at least one of the first or second tuning component has at least one property selected from an elastic modulus (E) of up to 0.5 GPa and a loss tangent (tan $\delta$) of at least 0.05 at frequencies ranging from 100 Hz to 1 kHz.

5. The RCDF method of claim 1, wherein at least one of the first or second tuning component is a polymer.

6. The RCDF method of claim 1, wherein at least one of the first or second tuning component is a rubber.

7. The RCDF method of claim 1, wherein at least one of the first or second tuning component is a pneumatic cylinder.

8. The RCDF method of claim 1, wherein the electrodes apply a finite compressive force continuously to the metallic glass feedstock during the step of passing an electrical current across the metallic glass feedstock through the electrodes.

9. The RCDF method of claim 1, wherein a finite electrical current continuously passes across the metallic glass feedstock during the step of passing an electrical current across the metallic glass feedstock through the electrodes.

10. The method of claim 1, wherein the first electrode assembly comprises an additional tuning component selected from a group consisting of a polymer block or a rubber block.

11. The method of claim 1, wherein the second electrode assembly comprises an additional tuning component selected from a group consisting of a polymer block, a rubber block, a pneumatic cylinder, a hydraulic drive, and a magnetic drive.

12. A metallic glass article prepared by the process of:
    applying a force to a metallic glass feedstock disposed between a first electrode assembly comprising a first electrode and a first tuning component and a second electrode assembly comprising a second electrode and a second tuning component; and
    passing an electrical current across the metallic glass feedstock through the electrodes of the two electrode assemblies to heat the metallic glass to a shaping temperature;
    wherein the first tuning component is selected from a group consisting of a pneumatic cylinder, a hydraulic drive, and a magnetic drive,
    wherein the second tuning component is selected from a group consisting of a polymer block, a rubber block, a pneumatic cylinder, a hydraulic drive, and a magnetic drive, and
    wherein at least one of the first or second tuning component has an elastic modulus (E) of up to 10 GPa at frequencies ranging from 10 Hz to 10 kHz and a component of each of the at least two electrode assemblies has a loss tangent (tan $\delta$) of at least 0.001 at frequencies ranging from 10 Hz to 10 kHz.

13. An RCDF apparatus comprising:
    a first electrode assembly comprising a first electrode and a first tuning component;

a second electrode assembly comprising a second electrode and a second tuning component,
wherein the first and second electrode assemblies apply a force on a metallic glass feedstock positioned between the first and second electrodes; and
a source of electrical energy in electrical connection with the first and second electrode assemblies adapted to deliver an electrical current capable of heating the metallic glass feedstock to a shaping temperature;
wherein the first tuning component is selected from a group consisting of a pneumatic cylinder, a hydraulic drive, and a magnetic drive,
wherein the second tuning component is selected from a group consisting of a polymer block, a rubber block, a pneumatic cylinder, a hydraulic drive, and a magnetic drive,
wherein the first and second tuning components of the first and second electrode assemblies have an elastic modulus (E) of up to 10 GPa at frequencies ranging from 10 Hz to 10 kHz, and a loss tangent (tan δ) of at least 0.001 at frequencies ranging from 10 Hz to 10 kHz.

14. The RCDF apparatus of claim 13, wherein at least one of the first or second tuning component has at least one property selected from an elastic modulus (E) of up to 5 GPa and a loss tangent (tan δ) of at least 0.005 at frequencies ranging from 20 Hz to 5 kHz.

15. The RCDF apparatus of claim 13, wherein at least one of the first or second tuning component has a property selected from an elastic modulus (E) of up to 1 GPa and a loss tangent (tan δ) of at least 0.01 at frequencies ranging from 50 Hz to 20 kHz.

16. The RCDF apparatus of claim 13, wherein at least one of the tuning components has at least one property selected from an elastic modulus (E) of up to 0.5 GPa and a loss tangent (tan δ) of at least 0.05 at frequencies ranging from 100 Hz to 1 kHz.

17. The RCDF apparatus of claim 13, wherein at least one of the tuning components is a polymer block.

18. The RCDF apparatus of claim 13, wherein at least one of the tuning components is a rubber block.

19. The RCDF apparatus of claim 13, wherein at least one of the tuning components is a pneumatic piston.

20. The apparatus of claim 13, wherein the first electrode assembly comprises an additional tuning component selected from a group consisting of a polymer block or a rubber block.

21. The apparatus of claim 13, wherein the second electrode assembly comprises an additional tuning component selected from a group consisting of a polymer block, a rubber block, a pneumatic cylinder, a hydraulic drive, and a magnetic drive.

* * * * *